Dec. 18, 1956  D. B. CREIGHTON  2,774,521
BEVERAGE CONTAINER AND DISPENSER
Filed March 4, 1955
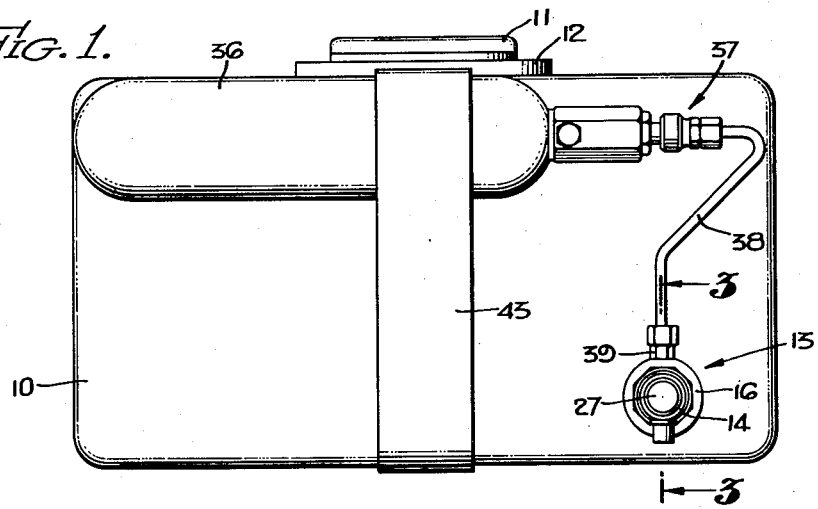
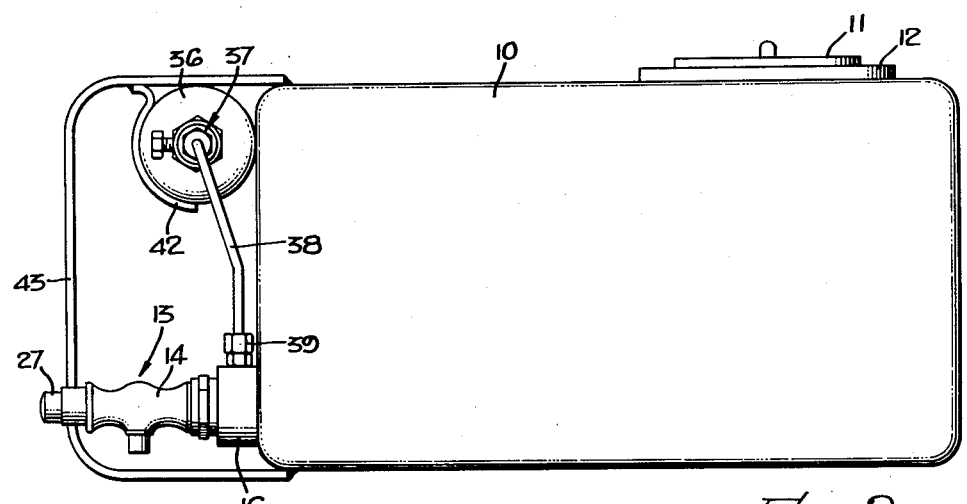
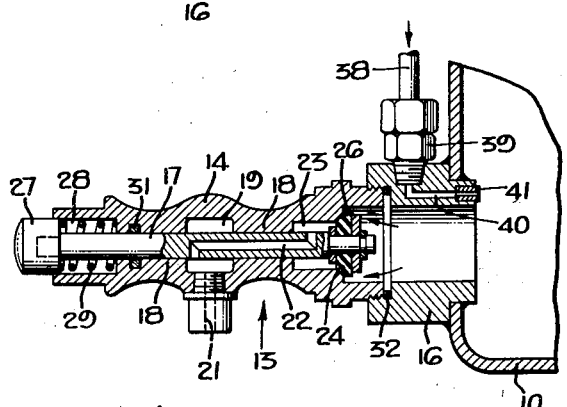
DELBERT B. CREIGHTON,
INVENTOR.
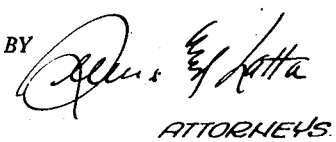
ATTORNEYS.

United States Patent Office 2,774,521
Patented Dec. 18, 1956

---

2,774,521

BEVERAGE CONTAINER AND DISPENSER

Delbert B. Creighton, Van Nuys, Calif.

Application March 4, 1955, Serial No. 492,138

5 Claims. (Cl. 222—399)

This invention relates to a beverage container and dispenser, and more particularly to a beverage containing and pressurizing means adapted to be stored within a conventional household refrigerator.

It is generally conceded among beer consumers that beer on draught has a much better and more satisfactory taste and flavor than beer in cans or bottles, particularly since draught beer is characterized by an absence of bitterness. This being the case, persons using beer as a refreshment at relatively large-sized gatherings conventionally use kegs of beer instead of beer in cans or bottles. However, beer kegs are extremely unwieldly and must be provided with special pumping means for removing the beer therefrom, and also with special means for keeping the beer cold. For these reasons, draught beer has not heretofore been employed in the home for small parties or by a single user, resort instead being had to bottles or cans which may be kept cold in the refrigerator.

In view of the above factors characteristic of presently employed means for storing and dispensing beer and other carbonated beverages, it is an object of the present invention to provide a beverage container and dispenser capable of storing a substantial amount of beer or other carbonated beverage under the requisite gas pressure, and which is adapted to be kept in a typical household refrigerator so that the beevrage is maintained cold and may be withdrawn at any time in either large or small quantities.

A further object is to provide a relatively large-sized beverage container which is sufficiently flat to fit between the shelves of a typical household refrigerator, and is provided with beverage pressurizing and a dispensing means such that the beverage will not become flat and may be withdrawn from the container while it remains in the refrigerator.

These and other objects and advantages of the invention will be more fully set forth in the following specification and claims considered in connection with the attached drawing to which they relate.

In the drawings:

Figure 1 is an end elevational view of a beverage container and dispenser embodying the present invention;

Figure 2 is a side elevational view of the container shown in Figure 1; and

Figure 3 is an enlarged fragmentary sectional view taken along line 3—3 of Figure 1 and illustrating the spigot and the valve means.

Referring now to the drawings, the beverage container and dispenser is illustrated as comprising a tank portion 10 of substantial size and which, in the illustrated form, is generally rectangular in shape. Tank 10 may, however, be generally rounded but it is imperative that the height of the tank be relatively small so that it may be slid between the shelves of conventional household refrigerators. Tank portion 10 preferably has a capacity of about two to three gallons, and is formed of stainless steel, plastic, or other suitable corrosion-resistant material.

The upper horizontal wall of tank portion 10 is provided with a relatively large diameter plug 11, the plug being preferably threaded into a fitting 12 in the upper tank wall and in sealed relation. The plug 11 is only unthreaded and removed during filling of the tank 10 with beverage, being at all other times threaded into fitting 12 so as to prevent leakage of liquid or gas from the tank.

Mounted in one end wall of tank 10, and adjacent the bottom thereof, is a spigot 13 which is employed for drawing beverage from the tank. Spigot 13, as shown best in Figure 3, is formed with an irregularly shaped elongated casing 14 the inner end of which is threaded into an annular fitting 16, the latter being welded in an opening in the tank end wall. As in the case of tank 10, fitting 16 and spigot 13 are formed of a corrosion resistant material, such as stainless steel, which will not impart a taste to the stored beverage.

The valve mechanism in spigot 13 comprises an elongated axial stem 17 which is slidably mounted in casing 14 by means of internal bearing portions 18. Bearing portions 18 define between them a chamber 19 which communicates through a spout passage 21 with the exterior of the apparatus. Stem 17 is formed with a passage 22 which connects chamber 19 with a second chamber 23 located at the inner end of casing 14 and relatively adjacent a counterbored opening to fitting 16.

The shoulder between chamber 23 and the counterbored opening at the inner end of casing 14 is beveled at 24 to form the seat for a poppet 26, the latter being suitably mounted at the inner end of stem 17. Poppet 26, which is preferably formed of a material such as nylon, is lifted off its beveled seat 24 upon pressing of a button 27 at the outer end of stem 17. Button 27 is adapted to extend into a chamber 28 in casing 14 and which contains a helical compression spring 29 for the purpose of normally urging poppet 26 to seated position.

An O-ring seal 31 is provided around stem 17, and a second O-ring 32 is provided at the inner end of casing 14 between it and fitting 16. The O-rings 31 and 32 prevent leakage from tank 10 and from the spigot 13, so that the only time beverage is withdrawn is when button 27 is pressed to shift poppet 26 off its seat 24. Beverage then flows into chamber 23, through passage 22, into chamber 19 and out passage 21. It is pointed out that the fluid pressure acting on the poppet 26 normally urges it against its seat, thereby increasing the sealing force preventing leakage of beverage.

In order to pressurize the contents of tank 10 to prevent the same from becoming flat upon continued storage, an elongated carbon dioxide cartridge 36 is provided above spigot 13 and is connected through a suitable valve and connecting fitting 37 with a metal tube 38. Tube 38, in turn, connects to a mounting plug 39 which is threaded into the upper portion of fitting 16 as shown in Figure 3. Communication is thus established between tube 38 and a passage 40 which extends longitudinally of fitting 16 and into tank 10. A small metering bushing 41 is provided at the end of passage 40 to restrict the flow of pressure gas into the tank, thereby preventing undesired squirting of beverage out passage 21 when button 27 is pressed.

The cartridge 36, which is illustrated as relatively large, is mounted by means of a spring clip 42 which in turn is welded on a U-shaped handle 43. Handle 43 is welded at its ends to the corners of tank 10 and extends over the end wall in which spigot 13 is mounted and over which cartridge 36 is secured. It will be seen that when it is desired to transport the beverage containing and dispensing unit it is merely necessary to grasp the handle 43, the spigot 13 and cartdidge 36 then being disposed uppermost.

In the operation of the present invention, tank 10 may be filled at a central business or "bottling" station with either beer or other suitable carbonated beverage such as soda pop. This filling is effected through removal of plug 11 and with automatic equipment located at the central station. Plug 11 is then mounted in place to prevent leakage of liquid or gas from the tank, and cartridge 36 is mounted through use of spring clip 42. Tube 38 is then connected to the cartridge through use of the valve and connecting fitting 37, and the latter is operated to permit escape of gas from the cartridge and through tube 38, passage 40 and bushing 41 (Figure 3) into the main body of tank 10. All of the space in tank 10 not occupied by fluid is thus filled with gas at approximately the same pressure as that in cartridge 36, preferably several pounds per square inch.

The tank 10 having been filled and gas pressure applied, the device is delivered in filled condition to the customer who immediately slides the tank between the shelves of his household refrigerator and with the spigot 13 and cartridge 36 outermost. The two or three gallons of beverage may then be withdrawn as desired, by merely opening the refrigerator door and pressing button 27 to shift stem 17 so that poppet 26 is unseated. Fluid then flows through chamber 23, passage 22 and passage 21 into the glass or mug disposed beneath the end of the passage 21. After the container has been emptied, it is picked up by the business operator and returned to the central point, where it is cleaned and refilled.

In the described manner, therefore, means are provided to sell enormous volumes of beer or other beverages in substantially draught form, and in such a way that the beverage may be maintained for weeks without becoming flat yet will be cold and may be dispensed at any time as desired. Not only is a great new market thus opened up for the selling of beverages of the type in question, but the device constitutes a substantial convenience to the householder in that the possibility that he will run out of cold beverage is reduced to a very minimum.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A storage container and dispenser for draught beer, which comprises a generally rectangular corrosion resistant tank, the height of said tank being less than the conventional spacing between shelves of a household refrigerator, a fill plug in the upper wall of said tank, a fitting in the lower portion of one end wall of said tank, a spigot threaded into said fitting and including sealed valve means for drawing beverage from said tank, a U-shaped handle mounted on said tank and bridging over said one end wall, mounting means provided on said handle, a gas pressure cartridge mounted in said mounting means, a tube connecting said cartridge to said fitting, and passage means in said fitting to effect communication between said tube and the inside of said tank.

2. The invention as claimed in claim 1, in which a calibrated bushing is provided to meter the flow of gas from said cartridge into said tank.

3. A container for pressurizing beverages suitable for stowage between the shelves of a household refrigerator, said container having a normally closed large area filling opening in a wall thereof, a dispensing spigot means mounted in one side wall near the lower edge thereof, and normally closed reciprocable valve means in said spigot having an inner end exposed to the pressure prevailing interiorly of said tank and urged toward seating position by said pressure, a carrying handle secured to said one side wall, a chamber adapted to be charged with gas under pressure connected to said container for supplying gas to the beverage within the container, and means supporting said gas chamber between said handle and the exterior of said one side wall in an area spaced from said spigot.

4. A container for pressurized beverages adapted for stowage between the shelves of a household refrigerator, said container being rectangular in shape and having a front end wall adapted to lie in a substantially vertical plane between the front edges of a pair of vertically spaced refrigerator shelves, spigot means supported in the lower portion of said front end wall and opening downwardly across the lower edge of said front end wall, a normally closed reciprocable valve means controlling the discharge of beverage through said spigot and having the interior end thereof subject to the pressure interiorly of the container so as to be urged toward closed position thereby, a cartridge for storing pressurized gas lying against said front end wall to one side of said spigot and having a connection extending into said container through said spigot, and carrying handle means secured to said front end wall and including means for supporting said cartridge.

5. A container for pressurized beverages adapted for stowage in a minimum amount of space between the shelves of a household refrigerator, said container being of rectangular shape and formed of sheet metal with a side wall thereof lying against a supporting shelf and one end wall disposed vertically near the front edge of the shelf, a dispensing spigot mounted in said end wall close to said side wall and discharging downwardly across the lower edge of said end wall, spring pressed valve means reciprocably supported in said spigot and normally held closed by said spring, a cylindrical cartridge for pressurized carbon dioxide lying closely adjacent said front end wall and spaced to one side of said spigot, valved means connecting said cartridge to the interior of said container, and common means providing a carrying handle for said container and for holding said cartridge in place against the end wall of said container.

References Cited in the file of this patent
UNITED STATES PATENTS

| | | |
|---|---|---|
| 635,678 | Eckhardt | Oct. 24, 1899 |
| 1,099,925 | Kleinfeldt et al. | June 16, 1914 |
| 1,979,604 | Burdge | Nov. 6, 1934 |
| 2,009,467 | Amsdell | July 30, 1935 |